United States Patent
Christie

(10) Patent No.: US 6,754,180 B1
(45) Date of Patent: Jun. 22, 2004

(54) SYSTEM, METHOD, AND COMPUTER PROGRAM PRODUCT FOR SUPPORT OF BEARER PATH SERVICES IN A DISTRIBUTED CONTROL NETWORK

(75) Inventor: Samuel H Christie, Cary, NC (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/461,884

(22) Filed: Dec. 15, 1999

(51) Int. Cl.[7] .................. G01R 31/08; H04L 12/28; H04L 12/68
(52) U.S. Cl. .................. 370/236; 370/352; 370/401; 379/133; 709/318
(58) Field of Search ................... 370/236, 352, 370/353–357, 400, 401, 404, 410, 426, 432, 466; 709/230, 227, 228, 318; 379/32.03, 32.01, 207.02, 229, 230, 196, 133

(56) References Cited

U.S. PATENT DOCUMENTS 6,256,612 B1 * 7/2001 Vo et al. .................. 704/500
6,324,279 B1 * 11/2001 Kalmanek et al. .......... 379/229
6,411,705 B2 * 6/2002 Oran et al. ................ 379/230
6,515,985 B2 * 2/2003 Shmulevich et al. ........ 370/356

OTHER PUBLICATIONS

Bharatia, V., Culpepper, B., "SIP INFO Method for Event Reporting," Internet Draft, Internet Engineering Task Force, Apr. 18, 2000, XP002206928.

Cuervo, F. et al., "Megaco Protocol," Internet Draft, Internet Engineering Task Force, Sep. 21, 1999, XP002206929.

Huitema, C. et al., "An Architecture for Residential Internet Telephony Service," IEEE Network, IEEE Inc., New York, NY, vol. 13, No. 3, May 1999, pp. 50–56, XP000870631.

* cited by examiner

Primary Examiner—Duc Ho
(74) Attorney, Agent, or Firm—Withrow & Terranova, PLLC

(57) ABSTRACT

A packet data network call has both a call signaling path 230 and a bearer path 220. The call signaling path 230 handles call control data necessary to setup, connect and process a call. The bearer path 220 is the actual voice data connection over which a conversation may take place. For many services the call signaling path 230 must be able to tap into the bearer path 220 in order to detect specific events. However, the bearer path 220 may only be accessed at specific points by specific nodes. In some cases MGC 210B has no control over the call other than as a signaling bridge between MGC 210A and MGC 210C. The present invention provides the intermediate MGC 210B with H.248 control reach through capability to a media gateway in the bearer path 220. One implementation is H.248 based in which messaging is modified so that a call control message requests an H.248 link to a specific gateway. Another implementation is ISUP based in which H.248 capabilities are added to ISUP based call control messages.

44 Claims, 6 Drawing Sheets

SYSTEM, METHOD, AND COMPUTER PROGRAM PRODUCT FOR SUPPORT OF BEARER PATH SERVICES IN A DISTRIBUTED CONTROL NETWORK

FIELD OF THE INVENTION

The present invention relates generally to providing H.248 protocol capabilities for a media gateway (MG) to other media gateway controllers (MGCs) in addition to the media gateway controller that owns the media gateway.

BACKGROUND OF THE INVENTION

In the architecture defined by the Media Gateway Control (MEGACO) IETF Working Group, a typical H.248 model comprises media gateways (MGs) focusing on media translation and media gateway controllers (MGCs) focusing on call signaling and call processing functions. Currently, media gateways are controlled by and associated with a single media gateway controller.

Voice-over IP (VoIP) calls, sometimes referred to as Internet telephony, have both a call signaling path and a bearer path. The call signaling path transfers call control data necessary to setup, connect and process a call. The bearer path is the actual voice data connection over which a conversation may take place. For many services call processing functions must be able to tap into the bearer path in order to detect specific events. However, the bearer path may only be accessed at specific points by specific nodes. In a typical VoIP call it is possible that several media gateway controllers are linked in the call signaling path while only two media gateways are in the bearer path. A media gateway port may have only one associated media gateway controller. Thus, if there are more media gateway controllers involved in a VoIP call than media gateways some of the media gateway controllers will not have access to bearer path event information normally provided by the MGC to MG protocol.

SUMMARY OF THE INVENTION

The present invention provides intermediate media gateway controllers with H.248 control reach through capability to a media gateway in the bearer path. Providing such capability eliminates the need to haul bearer paths unnecessarily to specific nodes just to monitor for DTMF tones or other bearer path information including detection of facsimile or data modem communications. By leaving the bearer path alone and providing H.248 control reach through capability to other media gateway controllers, the network operates more efficiently.

In accordance with a first embodiment of the invention is a method of providing the H.248 capabilities of a media gateway that is serving as one endpoint of a bearer path to a foreign media gateway controller for the purpose of providing bearer path access to the foreign media gateway controller. In typical call setup messaging, an answer message is modified to include a parameter requesting H.248 protocol capability. The owning media gateway controller sends a call control message to the foreign media gateway controller providing data pertaining to the media gateway. Using this data, an H.248 connection between the foreign media gateway controller and the media gateway is opened. The foreign media gateway controller can then monitor the bearer path associated with the media gateway.

In accordance with a second embodiment of the invention is a method of providing the H.248 capabilities of a media gateway that is serving as one endpoint of a bearer path to a foreign media gateway controller for the purpose of providing bearer path access to the foreign media gateway controller. A call control message is sent from the foreign media gateway controller to the owning media gateway controller which contains a parameter requesting notification of a specific event if the specific event should occur in the bearer path. The owning media gateway controller sends a request message to the media gateway which indicates the specific event of interest. When the requested event is detected, the media gateway sends a message indicating detection of the specific event to its owning media gateway controller. The owning media gateway controller then sends a call control message containing a parameter indicating detection of the specific event to the foreign media gateway controller. This implementation has the advantage of permitting the owning media gateway controller to act on the event before informing the foreign media gateway controller. This action might include deciding not to inform the foreign media gateway controller, to disconnect the call controlled via the foreign media gateway controller, or other actions.

An additional embodiment of the present invention is used to manipulate the bearer stream path for a remote media gateway. This is required to support changes of the near end connection endpoint address for the execution of services such as credit card, advice of charge, etc.

Other aspects and features of the present invention will become apparent to those ordinarily skilled in the art upon review of the following description of specific embodiments of the invention in conjunction with the accompanying figures.

DETAILED DISCLOSURE OF THE INVENTION

Figure 1:
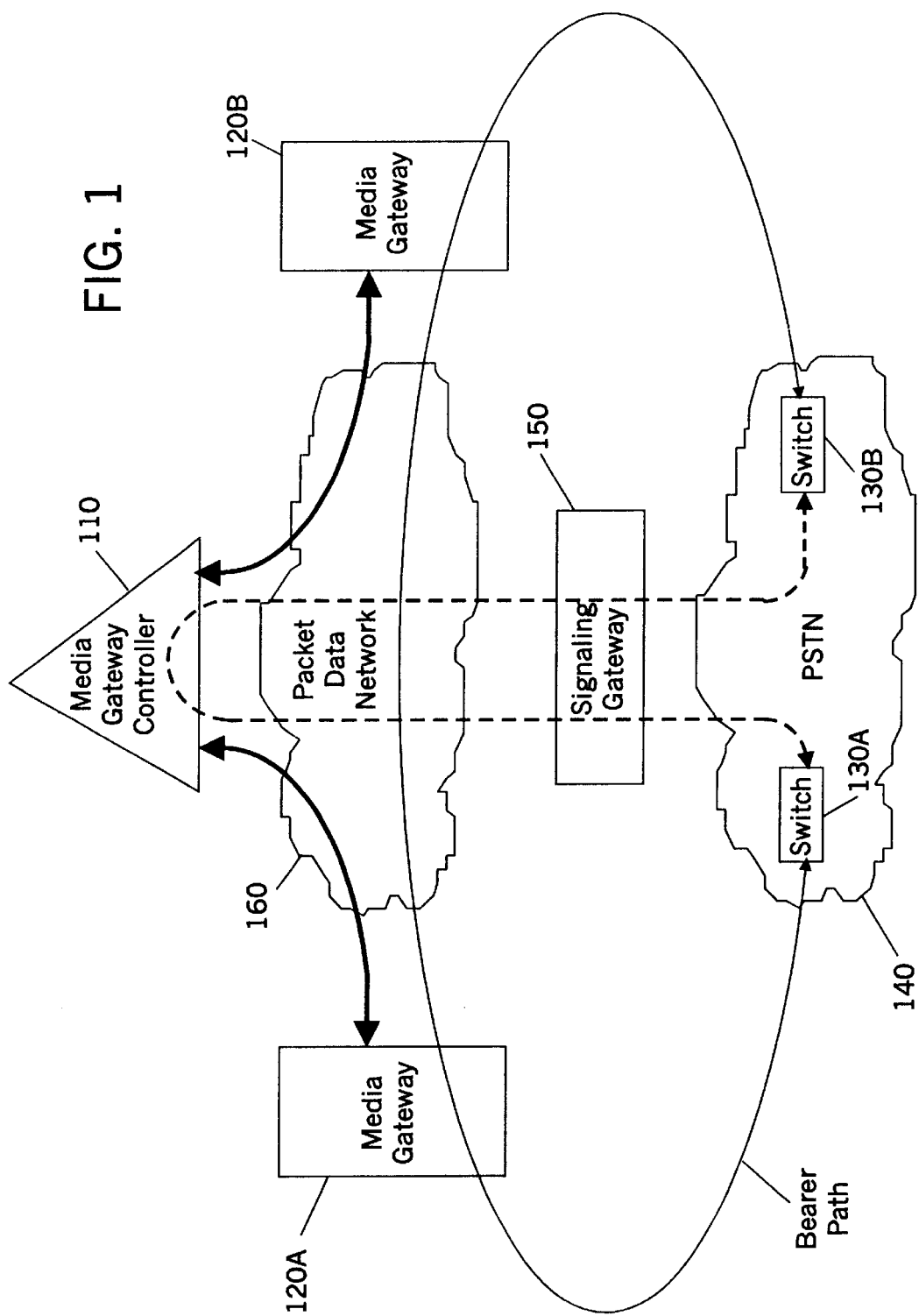
FIG. 1 is a typical network embodiment of a Media Gateway Control (MEGACO) architecture illustrating the call signaling path and bearer path of a packet data network call.

One aspect of the H.248 Protocol is to control media gateways (MGs) for data packet networks utilizing call control elements and intelligence external to the media gateways. The external call control elements are generally referred to as media gateway controllers (MGCs). This includes, but is not limited to, voice over IP and voice over ATM media gateways.

A media gateway (MG) in a packet telephony system is a network element that provides conversion between the audio signals carried on standard switched circuit networks and data packets carried over the Internet or over other packet data networks. H.248 assumes that the media gateway controllers will coordinate among themselves to send coherent commands to the media gateways under their control. As such, H.248 does not define a mechanism for coordinating media gateway controllers. H.248 is, in essence, a master/slave protocol, where the media gateways are expected to execute commands sent by the media gateway controllers and report events for use by the media gateway controller. H.248 further assumes a connection model where the basic constructs are endpoints and connections. Endpoints are sources or sinks of data and may be physical or virtual.

One example of a physical endpoint is an interface on a media gateway that terminates a trunk connected to a PSTN switch (e.g., Class 5, Class 4, etc.). A media gateway that terminates trunks is called a trunk gateway. Another example of a physical endpoint is an interface on a media gateway that terminates an analog POTS (Plain Old Telephone Service) connection to a phone, key system, PBX, etc. A media gateway that terminates residential POTS lines (to phones) is called a residential POTS gateway or a loop access gateway. An example of a virtual endpoint is an audio source in an audio-content server. Creation of physical endpoints entails hardware installation, while creation of virtual endpoints can be done by software.

H.248 is designed as an internal protocol within a distributed system that appears to the outside as a single media gateway. The model is composed of a media gateway controller, that may or may not be distributed over several computer platforms, and of a set of media gateways. In a typical configuration, the distributed gateway system will interface on one side with one or more telephony (i.e. circuit) switches, and on the other side with H.323 or SIP conformant systems.

In the H.248 model, the media gateways focus on the audio signal translation function, while the media gateway controllers handle the call signaling and call processing functions. As a result, the media gateway controller implements the "signaling" layers of the H.323 standard, and presents itself as an "H.323 Gatekeeper" or as one or more "H.323 Endpoints" to the H.323 systems.

The media gateway control interface functions provide for connection control and endpoint control. Both use the same system model and the same naming conventions.

H.248 assumes a connection model where the basic constructs are endpoints and connections. Connections are grouped in calls. One or more connections can belong to one call. Connections and calls are set up at the initiative of one or several media gateway controllers in which each media gateway controller operates on the data received from the previous media gateway controller in a serial fashion.

Connections may be either point-to-point or multi-point. A point-to-point connection is an association between two endpoints with the purpose of transmitting data between these endpoints. Once this association is established for both endpoints, data transfer between these endpoints can take place. A multi-point connection is established by connecting the endpoint to a multi-point session.

Connections can be established over several types of bearer path networks including transmission of audio packets using RTP and UDP over an IP network; transmission of audio packets using AAL2, or another adaptation layer, over an ATM network; and transmission of packets over an internal connection, for example the TDM backplane or the inter-connection bus of a gateway (this is used, in particular, for "hairpin" connections, connections that terminate in a gateway but are immediately re-routed over the telephone network).

FIG. 1 illustrates a typical Media Gateway Control (MEGACO) network architecture in which a single media gateway controller 110 is utilized to control a call between a pair of media gateways 120A, 120B. In this example, the calling endpoints are switches 130A, 130B within the public switching telephone network (PSTN) 140. The switches 130A, 130B are connected to actual telephones which are not shown. A call signaling path (shown as a dotted line) is responsible for transferring call control data necessary to setup, connect and process a call. The call signaling path runs from one endpoint (switch 130A) within the PSTN 140 into a signaling gateway 150 linked to a packet data network 160 (e.g., the Internet) into media gateway controller 110 and then back down to the other endpoint (switch 130B) via packet data network 160 and signaling gateway 150 to the PSTN 140.

The bearer path is the actual voice/data connection over which a conversation may take place. It also runs from PSTN switch endpoint 130A to PSTN switch endpoint 130B. However, its route is different from the call signaling path. The bearer path leaves PSTN switch endpoint 130A and enters a media gateway 120A linked to packet data network 160 which is linked to a second media gateway 120B. Media gateway 120B then relays the bearer path to PSTN switch endpoint 130B.

Media gateway controller 110 controls media gateways 120A, 120B. To do so, however, requires a media gateway control protocol link between media gateway controller 110 and each media gateway 120A, 120B. This link is illustrated in FIG. 1 as a bold line that connects media gateway controller 110 to each media gateway 120A, 120B via packet data network 160.

Figure 2:
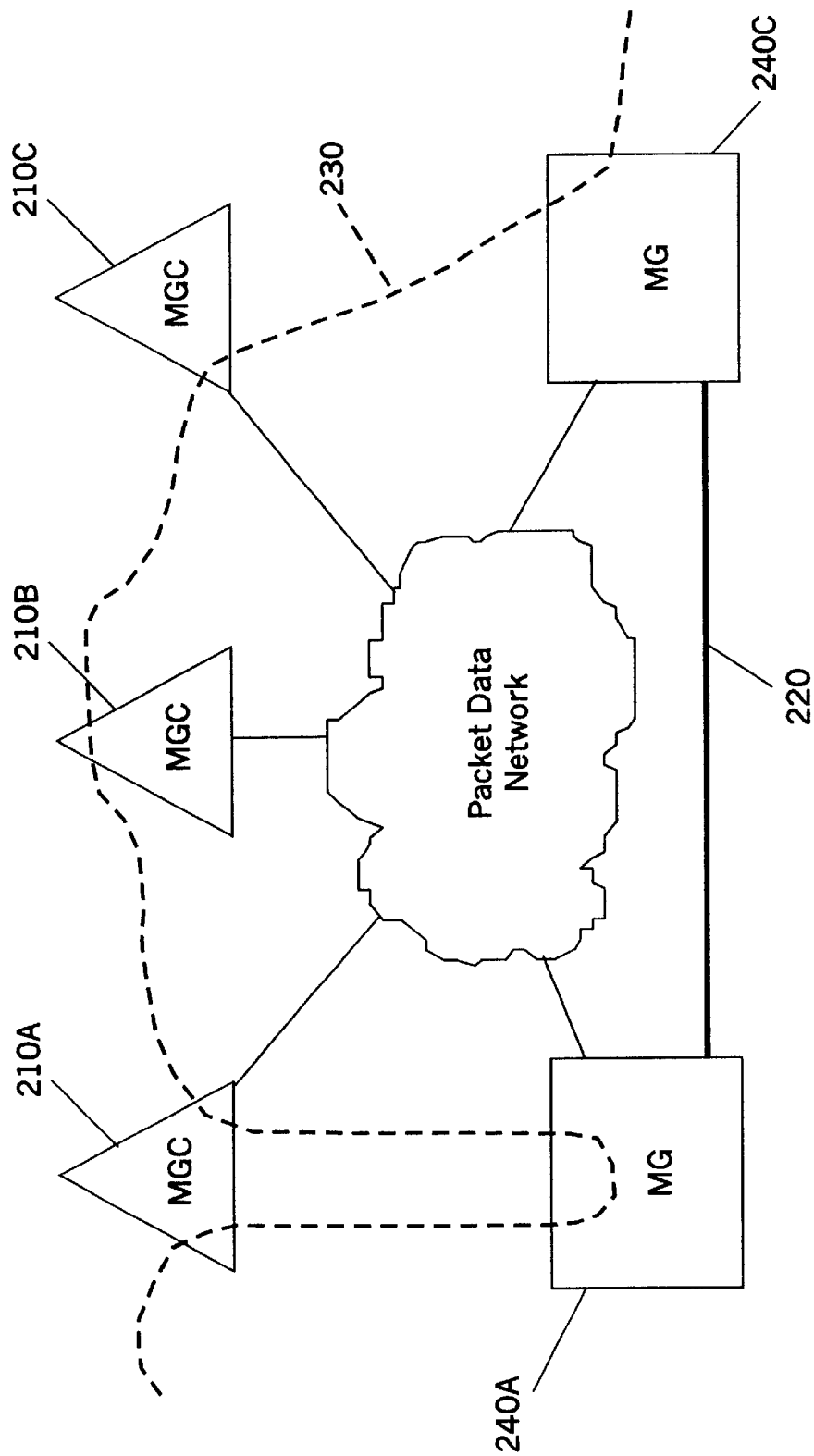
FIG. 2 is a network embodiment of a Media Gateway Control (MEGACO) architecture in which more than one media gateway controller is employed.

Thus, media gateway controller 110 has bearer path access to each media gateway 120A, 120B via the media gateway control protocol link. Bearer path access is needed in order to detect specific events. Once a specific event is detected media gateway controller 110 can issue call control commands or instructions to each endpoint 130A, 130B via the call signaling path, A problem occurs on a more complex call that needs to employ more than one media gateway controller in order to set up a connection between a pair of media gateways wherein at least one of the media gateway controllers does not have direct access to the bearer path. FIG. 2 illustrates an example of this problem in which multiple media gateway controllers are implemented in a Media Gateway Control (MEGACO) network architecture.

Consider FIG. 2, in which a network has three media gateway controllers (MGCs) 210A, 210B, 210C where only the first 210A and last 210C media gateway controller have associated media gateways (MGs) with access to the bearer path 220 for a specific call. This call has both a call signaling path 230 and a bearer path 220. For many services the call signaling path 230 must be able to tap into the bearer path 220 in order to detect specific events. However, the bearer path 220 may only be accessed at specific points by specific nodes. In the illustration of FIG. 2 it is evident that media gateway controller (MGC) 210A can access bearer path 220 via its associated media gateway (MG) 240A and media gateway controller (MGC) 210C can access bearer path 220 via its associated media gateway (MG) 240C. Media gateway controller (MGC) 210B has no associated media gateway within bearer path 220. As a consequence it does not have direct access to bearer path 220 and cannot monitor bearer path 220 for the detection of events. In essence, MGC 210B can act as a bridge between MGC 210A and MGC 210C, but cannot provide services requiring knowledge of events occurring in bearer path 220 such as channel associated signaling. Existing PSTN services such as calling card calls require detection of in-band tone for entry of a credit card number. The present invention provides the ability to implement this service and others requiring similar capabilities at MGC 210B.

The present invention provides the intermediate MGC 210B with H.248 control reach through capability to a media gateway 240A or 240C in bearer path 220. Providing such capability eliminates the need to haul bearer paths unnecessarily to specific nodes just to monitor for DTMF tones. By leaving the bearer path alone and providing H.248 control reach through capability to other media gateway controllers, the network operates more efficiently.

Figure 3:
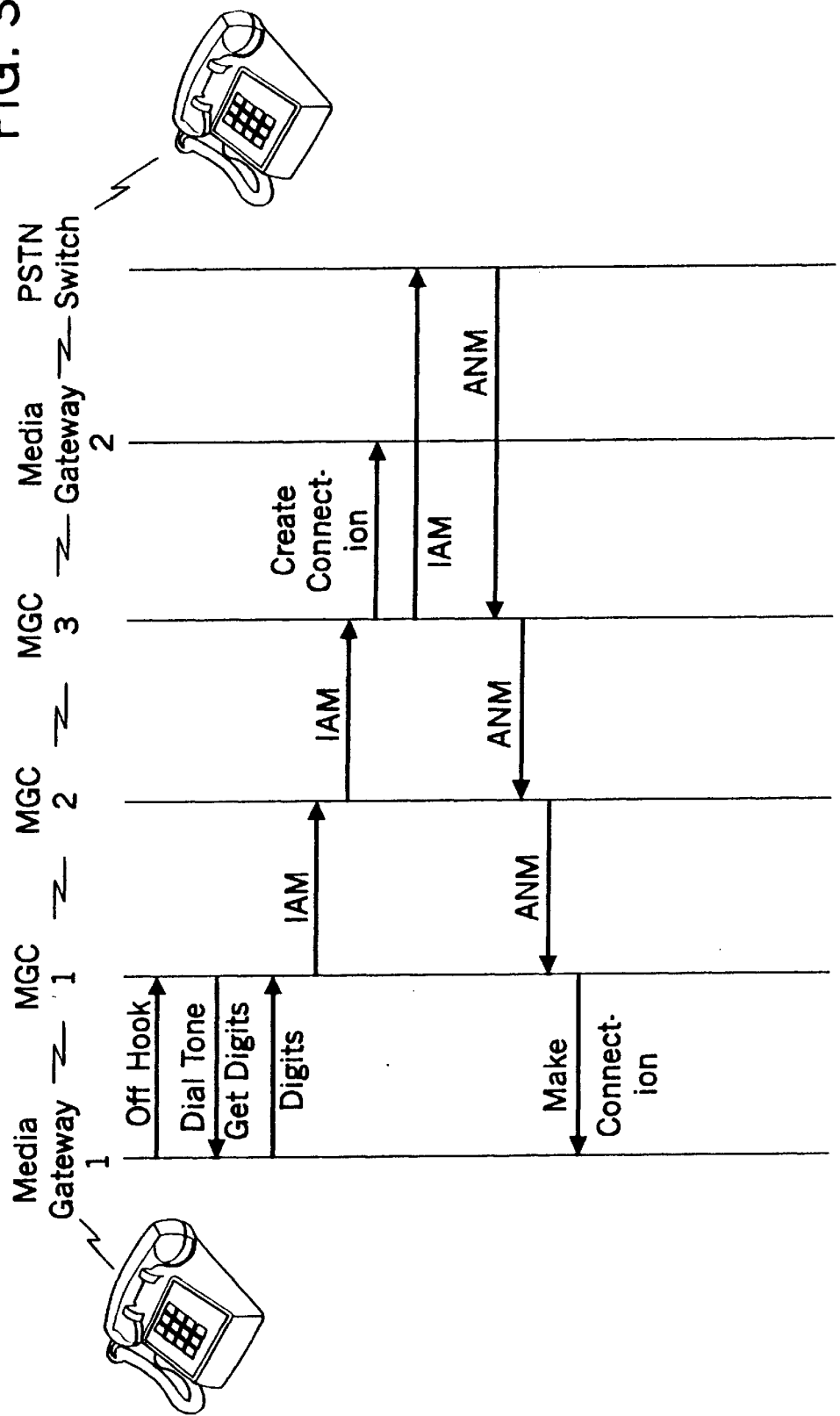
FIG. 3 is a message diagram illustrating typical messaging used to initiate and setup a packet data network call.

FIG. 3 is a message diagram illustrating typical messaging used to initiate a call. In this example, the media gateway is a line access gateway. It is presumed that the initializations process for an H.248 media gateway has already been successful. The media gateway (MG 1) sends an off-hook message to a first media gateway controller (MGC 1). MGC 1 responds with a dialtone and a get digits message. MG 1 then collects and returns a set of requested digits to MGC 1. For this example, the communications among MGCs is illustrated using ISUP message names. MGC 1 then sends an initial address message (IAM) to MGC 2, containing the address of MG 1 to be used for the bearer path. MGC 2 forwards the IAM to MGC 3. MGC 3 then sends a create connection message to a second media gateway (MG 2) in order to complete a call signaling path between MG 1 and MG 2. Once a connection is established, MGC 3 forwards the IAM to a PSTN switch, for instance. Further messaging between the PSTN switch and the end terminal device (phone) is not described as it is standard, well known in the art, and outside the scope of the present invention. Once an answer message is received into the PSTN switch from an end terminal device, the PSTN switch relays the answer message (ANM) back to MGC 3 for the connection established by MG 2. The ANM is propagated from MGC 3 to MGC 2 to MGC 1. Once the ANM is received into MGC 1, a create connection message is sent from MGC 1 to MG 1 establishing a communications bearer path between the media gateways. This allows voice data to be exchanged between the media gateways (i.e., a conversation can ensue). Thus, the call signaling path is routed through the MGCs while the bearer path is a direct connection between the media gateways.

Figure 4:
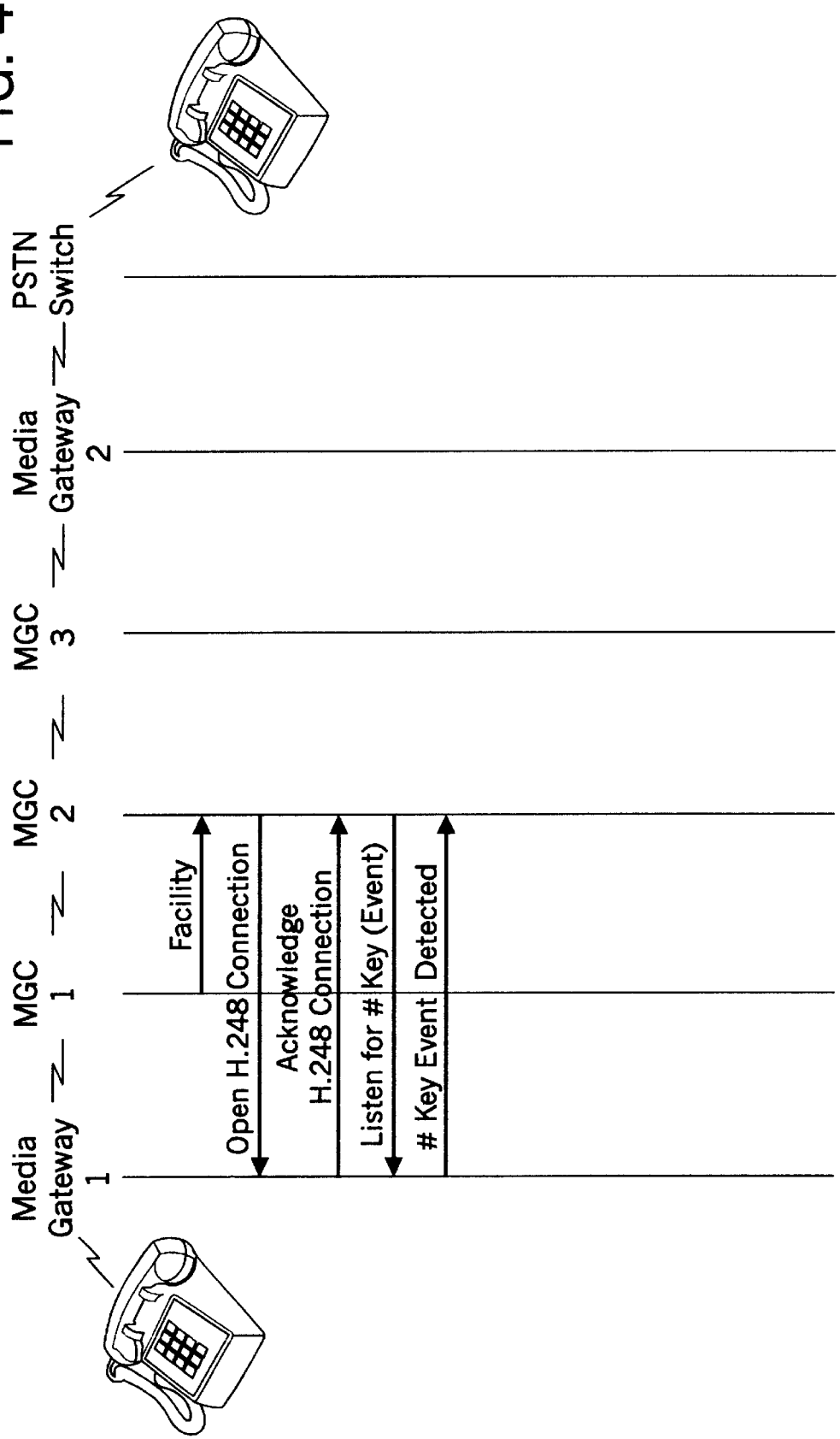
FIG. 4 is a message diagram illustrating H.248 based enhanced media gateway controller functionality.
Figure 5:
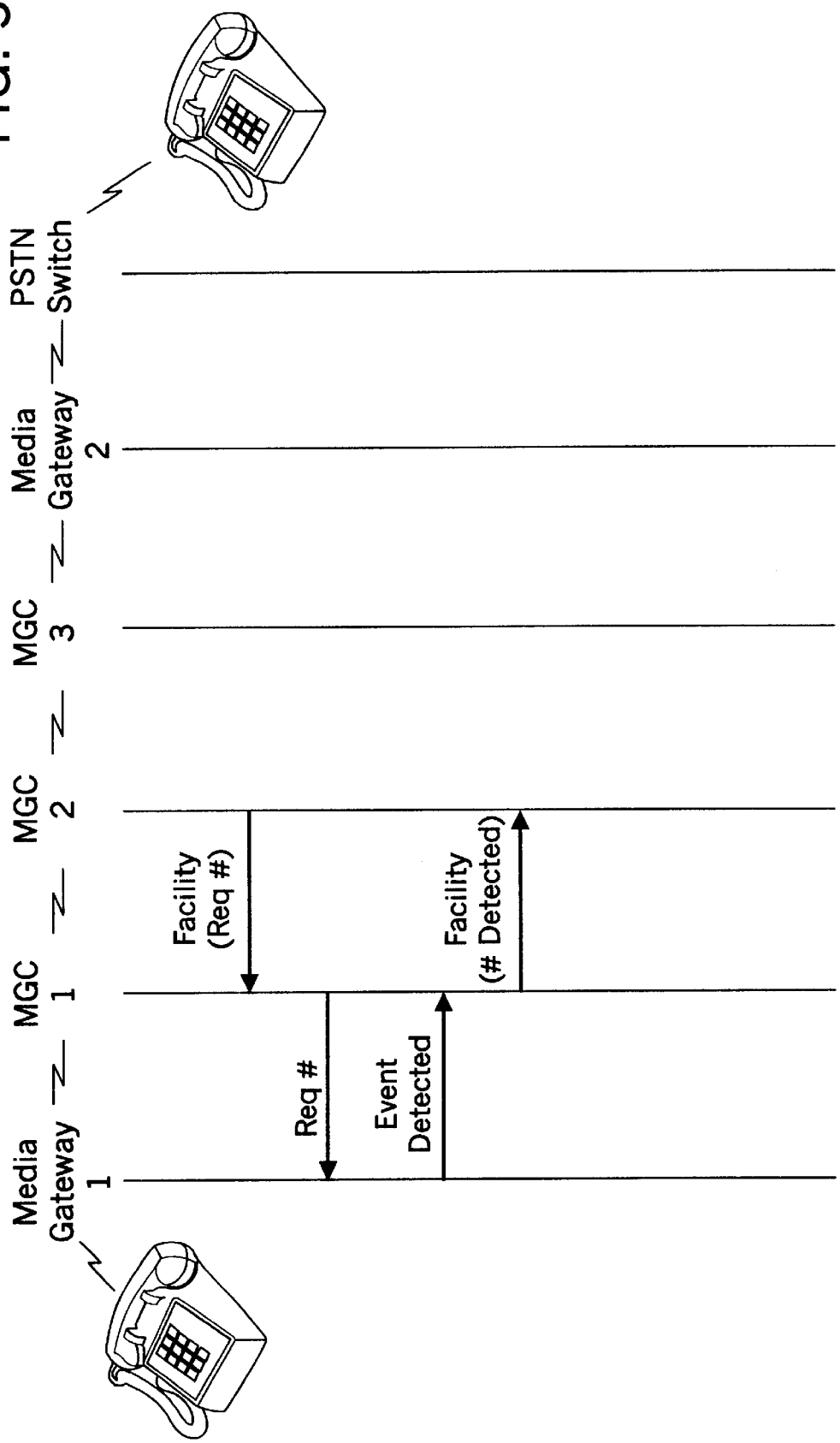
FIG. 5 is a message diagram illustrating ISUP based enhanced media gateway controller functionality.

FIGS. 4 & 5 are message diagrams of a specific scenario in which MGC 2 needs to know when the calling party has performed a specific event, namely pressing the pound (#) key. This event may be associated with, for instance, re-origination services in which the calling party does not hang up the phone in order to place another call after completing a previous call. This is a common occurrence for those who make calling card calls and do not wish to key in user information in order to place each call. Rather, the necessary data is keyed in for the first call and the calling party merely presses the pound (#) key for each additional call. This is termed re-origination.

FIG. 4 illustrates the above described example of detecting a pound (#) key implemented using H.248 based messaging. The premise of H.248 based messaging is to modify the answer message (ANM) illustrated in FIG. 3 to request an H.248 link between MGC 2 and MG 1. It is to be noted that the messaging illustrated in FIG. 4 occurs after the messaging that has occurred in FIG. 3. At this point, MGC 1 sends a call control message to MGC 2 containing the H.248 address of MG 1 to be monitored as well as a security token. MGC 2 then responds by creating an H.248 connection with MG 1 using the address data just obtained. MG 1 responds with an acknowledgment back to MGC 2 indicating that an H.248 connection has been established. Once the H.248 connection is established, MGC 2 can then monitor the bearer path for specific events. When the pound (#) key is depressed at the far end and is detected by MG 1, it sends a pound (#) detected event message back to MGC 2. MGC 2 can now act accordingly to the detected event. When the call is disconnected, the H.248 connection is closed. Thus, MGC 2 has been provided reach through capability to a media gateway not directly under its control.

It should be noted that the above example only enables MGC 2 to utilize ingress gateway MG 1 capabilities. One ordinarily skilled in the art would recognize that the same technique can be applied to the IAM or other ISUP messages such as a call control message, to permit greater flexibility. The extensions include support for access to the egress gateway as well as requesting gateway event notification after the call has already been established.

FIG. 5 illustrates the above described example of detecting a pound (#) key implemented using extensions of call signaling messages such as ISUP, PRI, H.323, etc. The premise of extended call control messaging is to insert H.248 capabilities to the call control protocol messages. For example, an ISUP facility message is used to request and return control of a single media gateway port between media gateway controllers involved in a call. This provides limited interaction management and message load reduction. It is to be noted that the messaging illustrated in FIG. 5 occurs after the messaging that has occurred in FIG. 3 which established a call. MGC 2 sends a facility message to MGC 1 containing a request pound (#) parameter. MGC 1, in turn, sends a request pound (#) message to MG 1, using H.248 for example. When a pound (#) key is detected by MG 1, it reports the event to MGC 1 in an event detected message. MGC 1 then sends a facility message containing a pound (#) detected parameter to MGC 2. MGC 2 now knows that a pound (#) key has been depressed on the far end and may use that information accordingly. In this example, the detection of the pound (#) key requests MGC 2 to initiate re-origination services. Once again, control reach through capability has been provided to MGC 2 for a gateway not directly under its control.

While the messaging illustrated herein is standard and well known in the telecommunications industry, certain modifications to messages have been made in order to implement the various embodiments of the invention. It is important to note that not all of the fields or parameters of a given message are required for a given task. It is not uncommon for a message to utilize only a portion of its available fields or parameters to achieve a task. Message modifications are routine and generally comprise alterations, additions, or modifications to the parameters of a message. Typical incidences of message modification include adding vendor extensions or modifications made by the standards process. In the ISUP based scenario of FIG. 4, the ISUP facility message would be extended to include the media gateway addressing data needed to support direct control of a media gateway from an alternate media gateway controller. Other facility message extension data includes IP address, name, port identifier, and a call specific password. Extensions required for the embodiment of FIG. 5 include encapsulation of H.248 messages into an ISUP message. FIG. 5 presumed the extension of a facility message. One skilled in the art could readily apply this to other ISUP messages.

FIGS. 4 & 5 have described an H.248 based and ISUP based messaging system to support control reach through capability to a media gateway. Other message based protocol implementations may be developed without departing from the spirit or scope of the present invention by those of ordinary skill in the art. For instance, Session Interface Protocol (SIP), H.323, Primary Rate Interface (PRI), or Basic Rate Interface (BRI), among others, may also serve as the messaging basis for control reach through capability. The basic premise is to add H.248 capabilities to the messages of a given protocol just as described above for ISUP.

Figure 6:
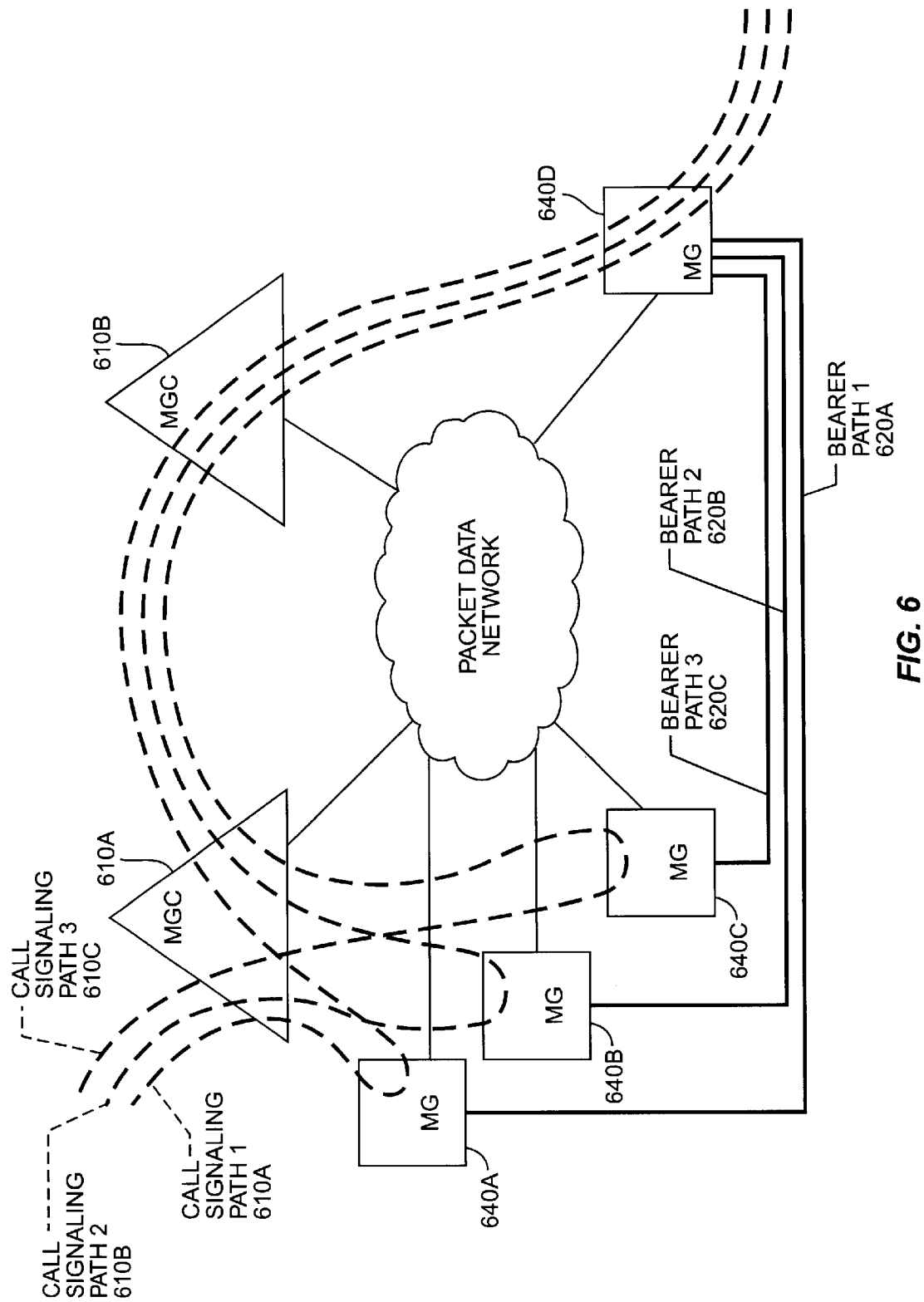
FIG. 6 is a network diagram illustrating a media gateway controller redirecting an audio stream from a remote media gateway.

FIG. 6 is a network diagram illustrating a scenario wherein a media gateway controller (MGC) redirects the audio stream from a remote media gateway (MG). Presume a call originating in the PSTN (not shown) and routed via MG 640D. Processing at MGC 610B presents the call to MGC 610A. MGC 610A determines the call requires user interaction at a service node (not shown) which is accessible via MG 640C. This user interaction could be prompting a user for their credit card number for example. MGC 610A accepts the original call and establishes a connection to MG 640C. credit card number for example. MGC 610A accepts the original call and establishes a connection to MG 640C.

After user interaction is completed, MGC 610A determines the actual user call destination is best reached via MG 640B. MGC 610A directs MG 640C to disconnect from the audio path via standard H.248 messages. To direct the connection path to MG 640B, MGC 610A sends an H.248 message r MG 640D using one of the methods described in FIGS. 4 and 5. MGC 610A employs the techniques described in FIG. 4 or 5 to request notification of a caller depressing the pound (#) key. Upon receipt of notification that the pound (#) key has been depressed, MGC 610A requires new user input, in this example new dialed digits. MGC 610A directs MG 640C to disconnect from the audio path via standard H.248 messages. MGC 610A uses the technique described above to request MG 640D apply a short tone and collect the new called party number. Upon receipt of the new number, MGC 610A determines the new user call destination is best reached via MG 640D. To direct the connection path to MG 640B, MGC 610A sends an H.248 message to MG 640D using one of the methods described in FIGS. 4 and 5.

It is noted that the service node described above as accessible via MG 640C may, in fact, be incorporated in said media gateway. In this case, the device, while not technically a gateway, serves as a media path endpoint with many of the attributes of a gateway.

It is to be understood that the present invention illustrated herein is readily implementable by those of ordinary skill in the art as a computer program product having a medium with a computer program embodied thereon. The computer program product is capable of being loaded and executed on the appropriate computer processing device(s) in order to carry out the method or process steps described. Appropriate computer program code in combination with hardware implements many of the elements of the present invention. This computer code is often stored on storage media. This media can be a diskette, hard disk, CD-ROM, optical storage media, or tape. The media can also be a memory storage device or collection of memory storage devices such as read-only memory (ROM) or random access memory (RAM). Additionally, the computer program code can be transferred to the appropriate hardware over some type of data network.

The present invention has been described, in part, with reference to flowchart illustrations or message diagrams. It will be understood that each block of a flowchart illustration or message diagram, and combinations of blocks in flowchart illustrations or message diagrams, can be implemented by computer program instructions.

These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks or message diagram(s).

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks or message diagram(s). The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block(s) or message diagram(s).

Accordingly, block(s) of flowchart illustrations or message diagram(s) support combinations of means for performing the specified functions, combinations of steps for performing the specified functions and program instruction means for performing the specified functions. It will also be understood that each block of flowchart illustrations or message diagram, and combinations of blocks in flowchart illustrations, or message diagrams can be implemented by special purpose hardware-based computer systems that perform the specified functions or steps, or combinations of special purpose hardware and computer instructions.

In the following claims, any means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A method of providing control over a media gateway under the direct control of a first media gateway controller to a second media gateway controller in which control is provided via extensions of call control messages, said method comprising:

sending a first call control message from said first media gateway controller to said second media gateway controller, said first call control message containing an extension for establishing a control link between said second media gateway controller and said media gateway.

2. The method of claim 1 wherein said control link between said media gateway and said second media gateway controller is used to carry H.248 messages.

3. The method of claim 1 further comprising:

receiving, in said first media gateway controller, a second call control message from said second media gateway controller requesting said first media gateway controller send said first call control message to said second media gateway controller.

4. A method of providing control over a media gateway under the direct control of a first media gateway controller to a second media gateway controller in which control is provided via extensions of call control messages, said method comprising:

in said second media gateway controller, receiving a first call control message from said first media gateway controller, said first call control message containing an extension for establishing a control link between said second media gateway controller and said media gateway.

5. The method of claim 4 wherein said control link between said media gateway and said second media gateway controller is used to carry H.248 messages.

6. The method of claim 4 further comprising:

in said second media gateway controller, sending a second call control message requesting said first call control message from said first media gateway controller to said second media gateway controller.

7. A method of providing control over a media gateway under the direct control of a first media gateway controller to a second media gateway controller in which control is provided via extensions of call control messages, said method comprising:

sending from said second media gateway controller a first call control message to said first media gateway controller in which the first call control message contains an extension that indicates a specific action said second media gateway controller requests said media gateway to perform.

8. The method of claim 7 wherein the extensions of the first call control message contain H.248 message elements.

9. The method of claim 7 wherein the specific action said second media gateway controller requests is a notification of an occurrence of a specified event.

10. The method of claim 7 further comprising:

receiving notification of performance of the specific action said second media gateway controller requested said notification received via a second call control message into said second media gateway controller in which the second call control message contains an extension.

11. A method of providing control over a media gateway under the direct control of a first media gateway controller to a second media gateway controller in which control is provided via extensions of call control messages, said method comprising:

receiving from said second media gateway controller a first call control message into said first media gateway controller in which the first call control message contains an extension that indicates a specific action said second media gateway controller requests said media gateway to perform.

12. The method of claim 11 wherein the extensions of the first call control message contain H.248 message elements.

13. The method of claim 11 wherein the specific action said second media gateway controller requests is a notification of an occurrence of a specified event.

14. The method of claim 11 further comprising:

receiving, from said media gateway, notification of performance of the specific action said second media gateway controller requested into said first media gateway controller; and processing said notification in said first media gateway controller.

15. The method of claim 14 wherein said processing results in relaying notification of performance of the specific action to said second media gateway controller via a second call control message containing an extension.

16. The method of claim 15 wherein said processing includes determining the form of the call control message to relay.

17. The method of claim 14 wherein said processing includes deciding not to relay notification of performance of the specific action.

18. The method of claim 14 wherein said processing includes the ability to affect call processing.

19. A computer program product for providing control over a media gateway under the direct control of a first media gateway controller to a second media gateway controller in which control is provided via extensions of call control messages, the computer program product having a medium with a computer program embodied thereon, the computer program product comprising:

computer program code for sending a first call control message from said first media gateway controller to said second media gateway controller, said first call control message containing an extension for establishing a control link between said second media gateway controller and said media gateway.

20. The computer program product of claim 19 wherein said control link between said media gateway and said second media gateway controller is used to carry H.248 messages.

21. The computer program product of claim 19 further comprising:

computer program code for receiving, in said first media gateway controller, a second call control message from said second media gateway controller requesting said first media gateway controller send said first call control message to said second media gateway controller.

22. A computer program product for providing control over a media gateway under the direct control of a first media gateway controller to a second media gateway controller in which control is provided via extensions of call control messages, the computer program product having a medium with a computer program embodied thereon, the computer program product comprising:

computer program code for receiving, in said second media gateway controller, a first call control message from said first media gateway controller, said call control message containing an extension for establishing a control link between said second media gateway controller and said media gateway.

23. The computer program product of claim 22 wherein said control link between said media gateway and said second media gateway controller is used to carry H.248 messages.

24. The computer program product of claim 22 further comprising:

computer program code for sending, in said second media gateway controller, a second call control message requesting said first call control message from said first media gateway controller to said second media gateway controller.

25. A computer program product for providing control over a media gateway under the direct control of a first media gateway controller to a second media gateway controller in which control is provided via extensions of call control messages, the computer program product having a medium with a computer program embodied thereon, the computer program product comprising:

computer program code for sending from said second media gateway controller a first call control message to said first media gateway controller in which the first call control message contains an extension that indicates a specific action said second media gateway controller requests said media gateway to perform.

26. The computer program product of claim 25 wherein the extensions of the first call control message contain H.248 message elements.

27. The computer program product of claim 25 wherein the specific action said second media gateway controller requests is a notification of an occurrence of a specified event.

28. The computer program product of claim 25 further comprising:

computer program code for receiving notification of performance of the specific action said second media gateway controller requested said notification receive via a second call control message into said second media gateway controller in which the second call control message contains an extension.

29. A computer program product for providing control over a media gateway under the direct control of a first media gateway controller to a second media gateway controller in which control is provided via extensions of call control messages, the computer program product having a medium with a computer program embodied thereon, the computer program product comprising:

computer program code for receiving from said second media gateway controller a first call control message into said first media gateway controller in which the first call control message contains an extension that indicates a specific action said second media gateway controller requests said media gateway to perform.

30. The computer program product of claim 29 wherein the extensions of the first call control message contain H.248 message elements.

31. The computer program product of claim 29 wherein the specific action said second media gateway controller requests is a notification of an occurrence of a specified event.

32. The computer program product of claim 29 further comprising:

computer program code for receiving, from said media gateway, notification of performance of the specific action said second media gateway controller requested into said first media gateway controller; and computer program code for processing said notification in said first media gateway controller.

33. The computer program product of claim 32 wherein said processing results in relaying notification of performance of the specific action to said second media gateway controller via a second call control message containing an extension.

34. The computer program product of claim 33 wherein said processing includes determining the form of the call control message to relay.

35. The computer program product of claim 32 wherein said processing includes deciding not to relay notification of performance of the specific action.

36. The computer program product of claim 32 wherein said processing includes the ability to affect call processing.

37. A first media gateway controller for providing control over a media gateway under the direct control of a second media gateway controller in which control is provided via extensions of call control messages, said first media gateway controller comprising:

means for sending a first call control message to said second media gateway controller, said first call control message containing an extension for establishing a control link between said second media gateway controller and said media gateway.

38. The media gateway controller of claim 37 further comprising:

means for receiving a second call control message from said second media gateway controller requesting said first media gateway controller send said first call control message to said second media gateway controller.

39. A first media gateway controller for providing control over a media gateway under the direct control of a second media gateway controller in which control is provided via extensions of call control messages, said first media gateway controller comprising:

means for receiving from said second media gateway controller a call control message in which the call control message contains an extension that indicates a specific action said second media gateway controller requests said media gateway to perform.

40. The media gateway controller of claim 39 further comprising:

means for receiving, from said media gateway, notification of performance of the specific action said second media gateway controller requested; and means for processing said notification in said first media gateway controller.

41. The media gateway controller of claim 40 wherein said processing results in relaying notification of performance of the specific action to said second media gateway controller via a call control message containing an extension.

42. The media gateway controller of claim 41 wherein said processing includes determining the form of the call control message to relay.

43. The media gateway controller of claim 40 wherein said processing includes deciding not to relay notification of performance of the specific action.

44. The media gateway controller of claim 40 wherein said processing includes the ability to affect call processing.

* * * * *